United States Patent [19]

Stobbe et al.

[11] 4,145,816
[45] Mar. 27, 1979

[54] SPINDLE PROBE WITH ORBITAL TRANSFORMER

[75] Inventors: Richard E. Stobbe, Greenfield; Richard Johnstone, Brookfield, both of Wis.

[73] Assignee: Kearney & Trecker Corporation, West Allis, Wis.

[21] Appl. No.: 853,764

[22] Filed: Nov. 21, 1977

[51] Int. Cl.² ............................................. G01B 7/02
[52] U.S. Cl. .................................................. 33/174 L
[58] Field of Search ............. 33/174 L, 174 P, 169 R, 33/172 E

[56] References Cited

U.S. PATENT DOCUMENTS

| | | | |
|---|---|---|---|
| 2,457,127 | 12/1948 | Chesus et al. | 343/124 |
| 2,867,783 | 1/1959 | Childs | 336/123 |
| 3,149,421 | 9/1964 | O'Brien | 33/17 EE |
| 3,164,909 | 1/1965 | Rosenberg | 33/174 L |

*Primary Examiner*—Harry N. Haroian
*Attorney, Agent, or Firm*—Cyril M. Hajewski; Donald J. Piggott

[57] ABSTRACT

A probe is mounted on the nose of a toolholder which fits into the spindle of a numerically controlled machine tool. An oscillator is mounted within the toolholder and is powered by a battery within the toolholder. The output of the oscillator is coupled to a primary coil on the toolholder which is inductively coupled to a ring-shaped secondary coil on the spindlehead of the machine tool. Switches within the toolholder are wired to the oscillator to cause it to shift frequency when the probe stylus makes contact with a workpiece when moving along any one of the X, Y or Z axes. The ring-shaped secondary coil is coupled to the machine tool's NC circuits to indicate when the probe makes contact with the workpiece.

5 Claims, 2 Drawing Figures

SPINDLE PROBE WITH ORBITAL TRANSFORMER

BACKGROUND OF THE INVENTION

This invention relates to probes for use in combination with a numerically controlled machine tool. In the past, probes have been mounted in toolholders which fit in the spindle of a numerically controlled machine tool. Radio transmitters have been mounted in the toolholder along with circuit means for changing the transmitter frequency when the probe makes contact with a workpiece. The probe served as an antenna for the transmitter and radiated the transmitter's output signal to a receiver which was coupled to the machine tool's NC circuits. The probe was used in combination with the NC circuits to accurately measure workpieces. A probe of this type is disclosed in copending U.S. patent application Ser. No. 805,914, which was filed June 13, 1977, for a "BINARY INSPECTION PROBE FOR NUMERICALLY CONTROLLED MACHINE TOOLS".

In the above-noted type of probe, problems have been encountered in that the radio transmission radiated from the probe extends beyond the immediate area of the machine tool and is subject to government regulations which prohibit the use of many desirable frequency bands because they are allocated for other uses. Also, the use of radiated transmissions requires government licensing not only by the manufacturer but also by the user of the probe. In addition, the use of radiated transmissions subjects the receiver circuit to the possibility of malfunction due to spurious radiations from other transmitters using the same frequency. The principal object of this invention is to provide an improved probe which does not suffer from the above-noted drawbacks.

SUMMARY OF THE INVENTION

In accordance with this invention, the above-noted drawbacks are overcome by coupling the output of an oscillator through a transformer which includes a primary coil on the toolholder and the adjacent secondary coil on the spindlehead. Coupling between the primary and secondary coil is by magnetic induction.

DESCRIPTION OF THE PREFERRED EMBODIMENTS

Figure 1:
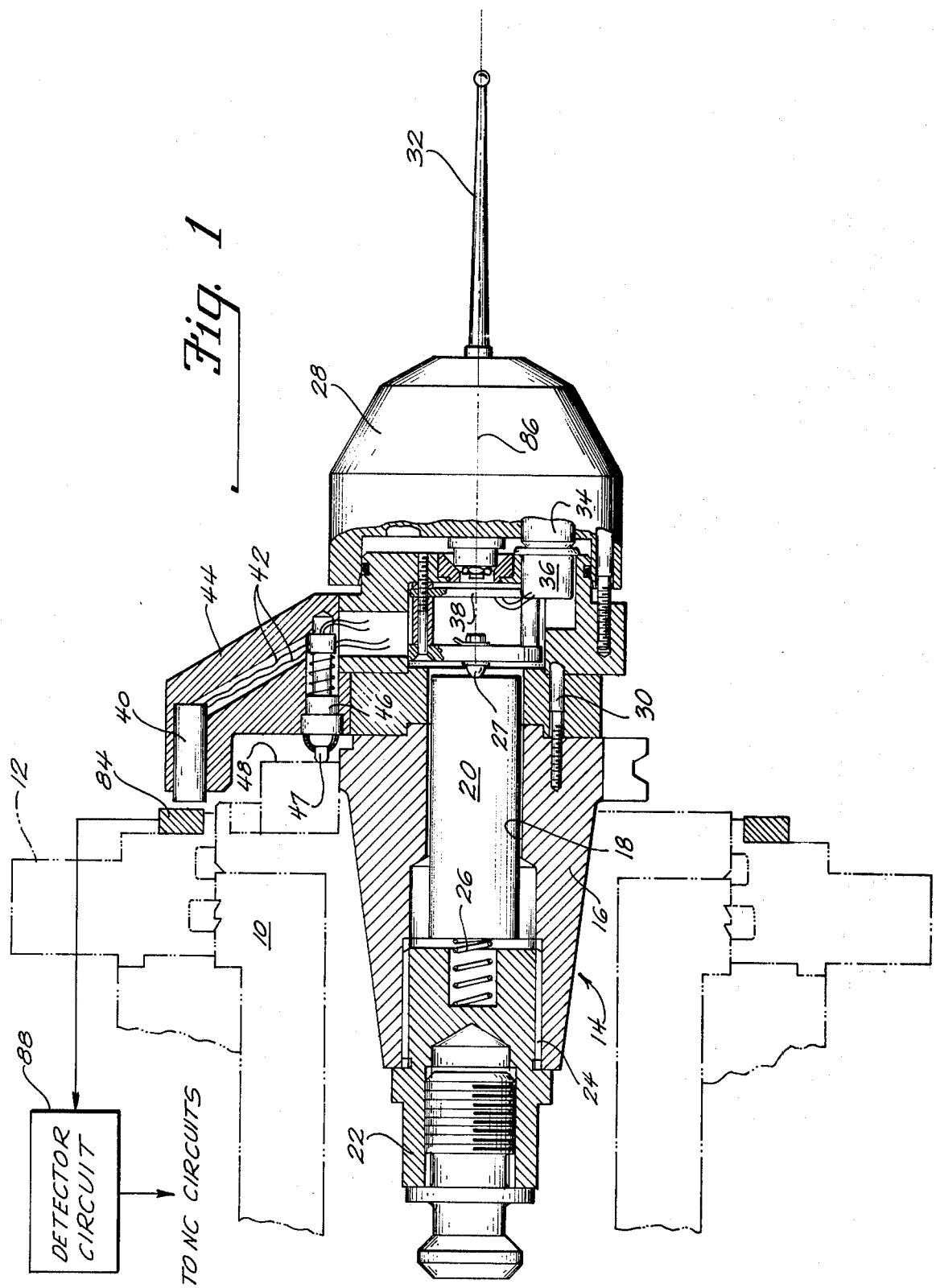
FIG. 1 is a longitudinal sectional view of a preferred embodiment of the invention; and, FIG. 2 is a schematic circuit diagram of the electrical portions of the embodiment shown in FIG. 1.

FIG. 1 shows a preferred embodiment of the invention. Reference numeral 10 designates the spindle of a numerically controlled machine tool and reference numeral 12 designates the spindlehead in which spindle 10 is journalled for rotation. A toolholder 14 which has a standard configuration on its inner end portion is clamped in the tool socket of spindle 10 by conventional means not shown. Toolholder 14 has a body portion 16 with a central cavity 18 within which a battery 20 is mounted. An inner end portion 22 is attached to body portion 16 by screw threads 24 and has a spring 26 which bears against the negative terminal of battery 20 and acts as the ground connection therefor. An electrical contact 27 bears against the positive terminal of battery 20.

A nose portion 28 is attached to the outer end of body portion 16 by machine screws 30, one of which is shown in FIG. 1. A probe element 32 is attached to nose portion 28 and projects outwardly therefrom. A conventional switch assembly (not shown) is connected to probe element 32 within nose portion 28 and acts to close switch contacts when probe element 32 is moved slightly along the machine tools X, Y or Z axes. This portion of the disclosed embodiment is conventional in structure and hence is not disclosed in detail herein. The electrical conductors (not shown) from the above-noted switch assembly (not shown) are coupled through an electrical plug 34 and socket 36 to a printed circuit board 38 which contains an oscillator circuit whose output is applied to a primary coil 40 via conductors 42. Primary coil 40 is mounted on an arm 44 which projects laterally from nose portion 28 and also contains a switch 46 having a plunger 47 which is actuated by contact with the spindle nose portion 48 when toolholder 14 is clamped in spindle 10. Switch 46 acts to connect battery 20 to printed circuit 38 when toolholder 14 is inserted into spindle 10 and to disconnect battery 20 when toolholder 14 is removed from spindle 10. For this purpose, switch 46 is spring loaded in the normally open position and opens as soon as the switch plunger 47 breaks contact with spindle nose 48.

Figure 2:
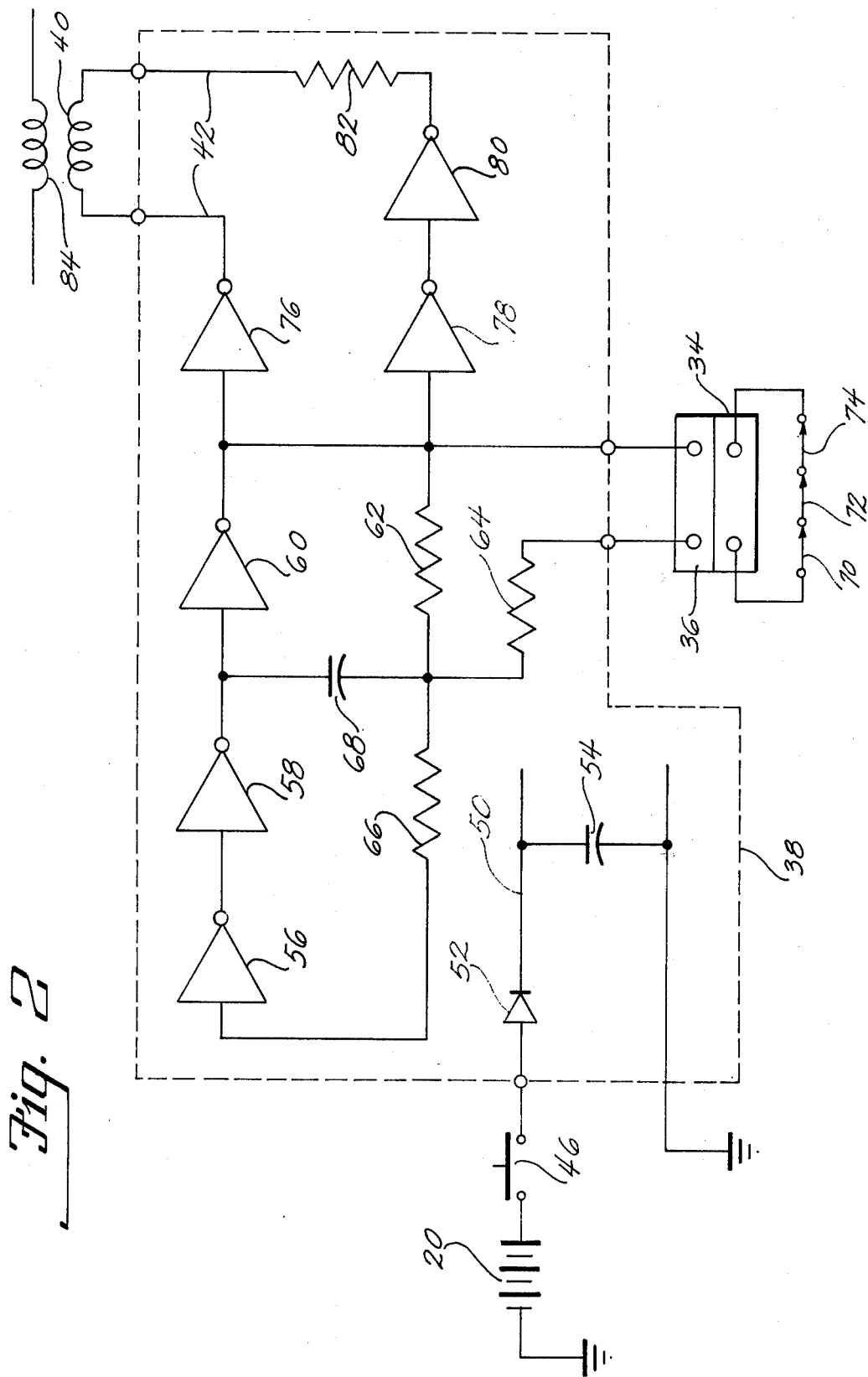

The electrical circuit for the oscillator is shown in FIG. 2. The power supply for the oscillator comprises battery 20 which is coupled to power supply conductor 50 via the normally open contacts of switch 46 and a diode 52 which protects the circuit from reverse voltage in the case that battery 20 is installed backward. A filter capacitor 54 is coupled between conductor 50 and ground to filter out noise and oscillations from the power supply. The detailed connection between power supply conductor 50 and the active elements of the circuit is not shown but will be apparent to those skilled in the art.

The oscillator is formed by three inverting amplifiers 56, 58 and 60 which are coupled in a ring through resistors 62, 64 and 66 and capacitor 68. The frequency of oscillation is determined by the propagation delay around the ring which is determined in part by the RC time constant of the feedback loop. The RC time constant is varied by switches 70, 72 and 74 which are opened by probe element 32 whenever probe element 32 is moved slightly by contact with a workpiece while being moved along the X, Y or Z axes of the machine tool. Switch 70 corresponds to the X axis, switch 72 corresponds to the Y axis, and switch 74 corresponds to the Z axis. When any one of the switches 70, 72 or 74 is opened, resistor 64 is disconnected from the circuit, which alters the RC time constant of the feedback loop and thus alters the frequency of the oscillator. Therefore, an alteration in the frequency of the oscillator is an indication that probe element 32 has made contact with a workpiece.

The output of the oscillator circuit is amplified by a push pull amplifier circuit which is made up of three inverting amplifiers 76, 78 and 80 which are connected in series with RF primary coil 40 and load resistor 82 as shown in FIG. 2 with amplifier 76 on one side of coil 40 and amplifiers 78 and 80 on the other side of coil 40.

The output of primary coil 40 is coupled by magnetic induction to a ring-shaped secondary coil 84 which is attached to spindlehead 12 (see FIG. 1) coaxial with the axis 86 of spindle 10 adjacent to primary coil 40. Since secondary coil 84 is coaxial with the axis of spindle 10, primary coil 40 will be adjacent to secondary coil 84 regardless of the angular orientation of toolholder 16. Coils 40 and 84 are located as close as possible to each other to provide a relatively high co-efficient of coupling. Primary coil 40 is preferably shielded by electrically conductive metal on the surfaces thereof not adjacent to secondary coil 84 to reduce electromagnetic radiation to a minimum. Coupling between transformer coils 40 and 84 is by magnetic induction which does not require electromagnetic radiation.

Secondary coil 84 is coupled to conventional detector circuitry 88 (FIG. 1) which, in turn, is coupled to the NC circuits (not shown) of the machine tool. The relatively high coefficient of coupling between transformer coils 40 and 84 enables the threshhold of detector circuit 88 to be raised high enough to eliminate the possibility of malfunction due to spurious radiation from other transmitters.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. A spindle probe for a machine tool having a spindlehead and having a spindle rotatably mounted on said spindlehead for rotation about a spindle axis, said spindle being adapted to receive a toolholder and said spindle probe comprising:

a toolholder adapted to fit in said spindle;
    a probe element on said toolholder;
    an oscillator within said toolholder;
    means within said toolholder for energizing said oscillator;
    means within said toolholder for altering the output of said oscillator when said probe element contacts a surface being measured;
    a primary coil mounted on said toolholder and coupled to the output of said oscillator; and
    a secondary coil mounted on said spindlehead adjacent to said toolholder to receive signals from said primary coil.

2. A spindle probe according to claim 1 wherein said secondary coil is ring-shaped and is mounted on said spindlehead coaxial with said spindle axis.

3. A spindle probe according to claim 1 and further comprising an arm projecting laterally from said toolholder, said primary coil being mounted in said arm.

4. A spindle probe according to claim 3 wherein said means for energizing said oscillator comprises a battery and further comprising a pressure actuated switch on said arm and means coupling said switch in series with said battery to connect said battery to said oscillator circuit when said switch is actuated.

5. A spindle probe according to claim 3 wherein there is electrically conductive metal around the portions of said primary coil which are not adjacent to said secondary coil to minimize electromagnetic radiation from said primary coil.

* * * * *